(12) United States Patent
King et al.

(10) Patent No.: US 10,875,629 B2
(45) Date of Patent: Dec. 29, 2020

(54) YOKE INSTALLATION PROTECTION ASSEMBLY WITH INTEGRATED INCLINOMETER PORTION

(71) Applicant: Gulfstream Aerospace Corporation, Savannah, GA (US)

(72) Inventors: Gloria King, Rincon, GA (US); Jason Bateham, Savannah, GA (US); Adam Kajfez, Savannah, GA (US); Jonathan Edwards, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 353 days.

(21) Appl. No.: 15/942,942

(22) Filed: Apr. 2, 2018

(65) Prior Publication Data

US 2019/0300154 A1    Oct. 3, 2019

(51) Int. Cl.
*B64C 13/04* (2006.01)
*B64D 43/00* (2006.01)
*B64F 5/10* (2017.01)

(52) U.S. Cl.
CPC .......... *B64C 13/0423* (2018.01); *B64D 43/00* (2013.01); *B64F 5/10* (2017.01)

(58) Field of Classification Search
CPC ....... B64C 13/0423; B64D 43/00; B64F 5/10; B62D 15/0245; G01B 21/22; G01B 21/26; G01C 9/00

USPC ......................................................... 244/234
See application file for complete search history.

(56) References Cited

U.S. PATENT DOCUMENTS

| 1,987,599 | A | * | 1/1935 | Bennett | B62D 1/06 74/558.5 |
|---|---|---|---|---|---|
| 5,540,067 | A | * | 7/1996 | Kim | B60R 25/0225 70/163 |
| 5,566,560 | A | * | 10/1996 | LiCausi | B60R 25/0228 70/18 |
| 5,911,391 | A | | 6/1999 | Russ et al. | |
| 5,996,721 | A | * | 12/1999 | Winner | B60R 25/0225 180/287 |
| 2012/0261520 | A1 | | 10/2012 | Groomes et al. | |
| 2013/0227848 | A1 | * | 9/2013 | Wilds | G01C 9/02 33/301 |
| 2017/0131095 | A1 | | 5/2017 | Kim | |

* cited by examiner

*Primary Examiner* — Claude J Brown
(74) *Attorney, Agent, or Firm* — LKGlobal | Lorenz & Kopf, LLP

(57) ABSTRACT

Yoke alignment assemblies, aircraft, and rigid covers are provided. An aircraft includes a yoke alignment assembly. A yoke alignment assembly is provided for aligning an aircraft yoke with a column. The yoke alignment assembly includes a rigid cover and a flexible cover. The rigid cover defines a protective portion configured to protect the yoke. The inclinometer portion is configured to hold an inclinometer. The flexible cover is secured to an upper part of the protective portion and is configured to protect the yoke.

20 Claims, 6 Drawing Sheets

YOKE INSTALLATION PROTECTION ASSEMBLY WITH INTEGRATED INCLINOMETER PORTION

TECHNICAL FIELD

The technical field relates generally to aircraft manufacturing and yoke installation devices, and more particularly relates to a device and method for protecting and aligning a yoke during installation on an aircraft.

BACKGROUND

Assembly of aircraft components occasionally results in damage to surfaces of the components. For example, technicians installing aircraft yokes on steering columns may inadvertently scratch surfaces on the yoke. Scratches and other damage to the surfaces may require removal and replacement of the yoke. Removal and replacement of the yoke imposes undesirable costs in the form of technician time and part replacement.

As such, it is desirable to provide an assembly to reduce damage to components during installation on an aircraft. In addition, other desirable features and characteristics will become apparent from the subsequent summary and detailed description, and the appended claims, taken in conjunction with the accompanying drawings and this background.

SUMMARY OF EMBODIMENTS

Various non-limiting embodiments of a yoke alignment assembly, an aircraft, and a rigid cover are disclosed herein.

In a first non-limiting embodiment, a yoke alignment assembly for aligning an aircraft yoke with a column includes, but is not limited to, a rigid cover, a flexible cover, and an inclinometer. The yoke alignment assembly includes a rigid cover and a flexible cover. The rigid cover defines a protective portion configured to protect the yoke. The inclinometer portion is configured to hold an inclinometer. The flexible cover is secured to an upper part of the protective portion and is configured to protect the yoke.

In a second non-limiting embodiment, an aircraft in a partially completed manufacturing state includes, but is not limited to, a steering column, a yoke, and a yoke alignment assembly. The yoke is configured to attach to the steering column. The yoke alignment assembly is secured to the yoke. The yoke alignment assembly includes a rigid cover, a flexible cover, and an inclinometer. The rigid cover defines a protective portion and an inclinometer portion. The flexible cover is secured to an upper part of the protective portion. The inclinometer is disposed in the inclinometer portion of the rigid cover.

In a third non-limiting embodiment, a rigid cover for protecting an aircraft yoke during installation includes, but is not limited to, a protective portion and an inclinometer portion. The protective portion defines an interior surface configured to conform to and cover an outwardly facing surface of the aircraft yoke. The inclinometer portion is configured to hold an inclinometer.

BRIEF DESCRIPTION OF THE DRAWINGS

Advantages of the present invention will be readily appreciated, as the same become better understood by reference to the following detailed description when considered in connection with the accompanying drawings wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Various non-limiting embodiments of yoke alignment assemblies, aircraft, and rigid covers are disclosed herein. The yoke alignment assemblies protect a front and aback of the yoke from damage while retaining the ability of the yoke to rotate and reset a position of the yoke for installation. In general, a rigid cover protects a front of the yoke while a flexible cover protects a back part of the yoke and the steering column. The yoke alignment assemblies further include an inclinometer portion configured to hold an inclinometer in a position required for alignment and installation of the yoke on the steering column. A greater understanding of the aircraft component and aircraft may be obtained through a review of the illustrations accompanying this application together with a review of the detailed description that follows.

Figure 1:
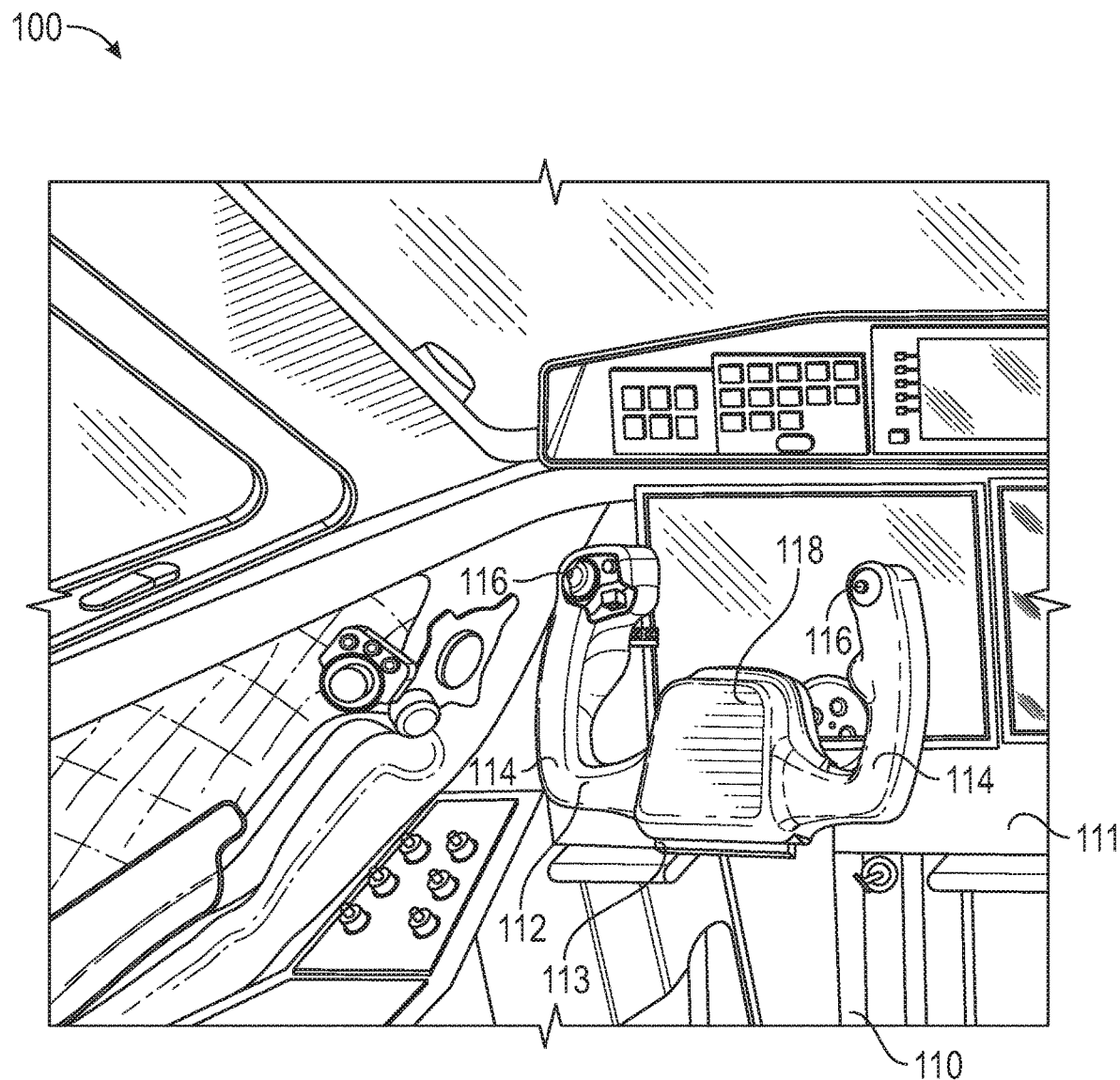
FIG. 1 is a simplified diagram illustrating a prior art aircraft and flight deck for use with a yoke alignment assembly in accordance with the teachings of the present disclosure.

FIG. 1 is a simplified diagram of a prior art aircraft 100 for use with a yoke alignment assembly discussed below. In the example provided, aircraft 100 is a transport category aircraft. It should be appreciated that aircraft 100 may be any type of vehicle, such as an airplane, a helicopter, a submarine, and the like without departing from the scope of the present disclosure.

Aircraft 100 includes a steering column 110 and a yoke 112. Steering column 110 extends out from an instrument panel 111 of aircraft 100 to transmit steering inputs from yoke 112 to a flight system of aircraft 100, as will be appreciated by those with ordinary skill in the art.

Figure 2A:
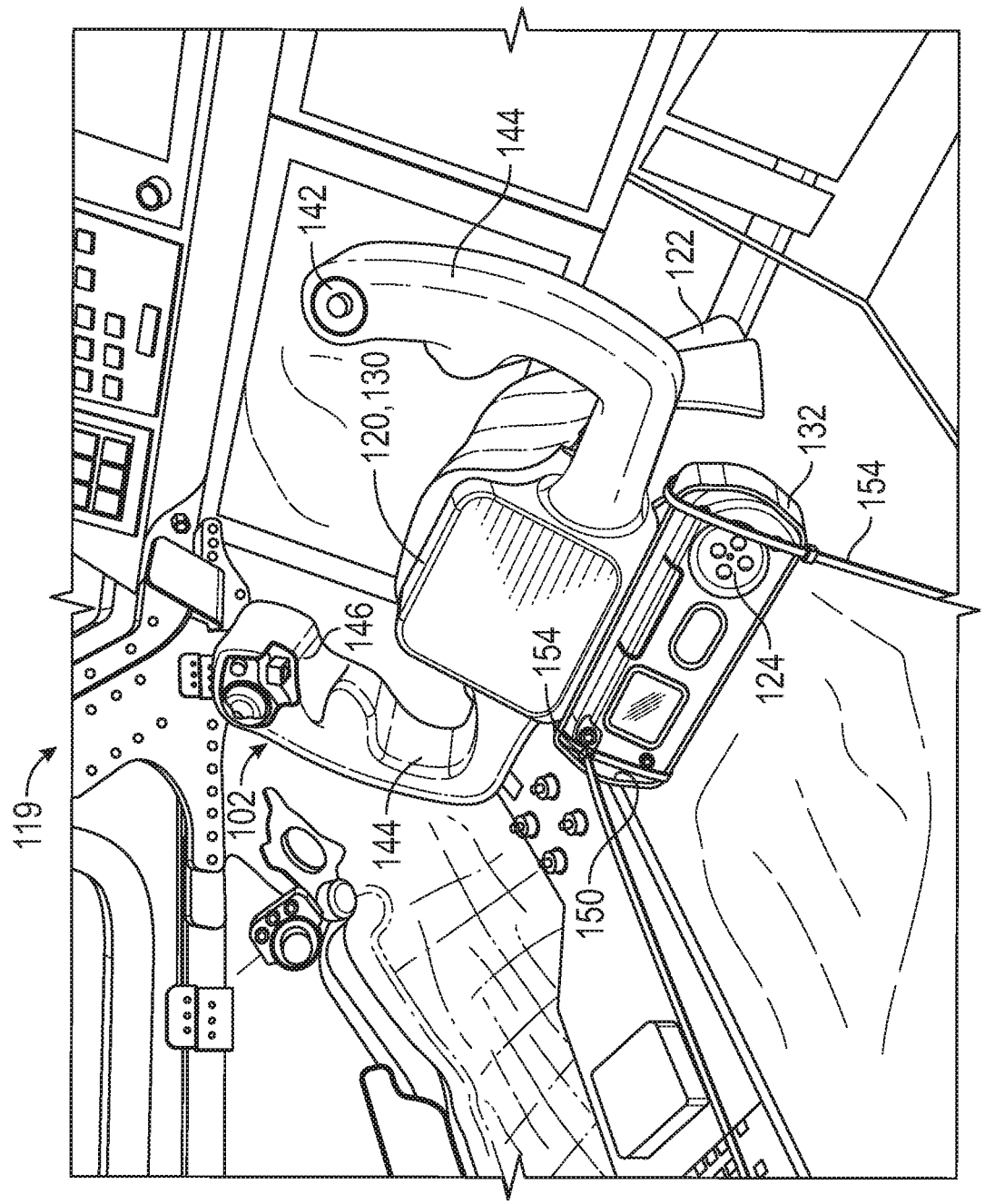
FIGS. 2A, 2B, 2C, and 2D are views illustrating components of a yoke alignment assembly in accordance with the teachings of the present disclosure.
Figure 2B:
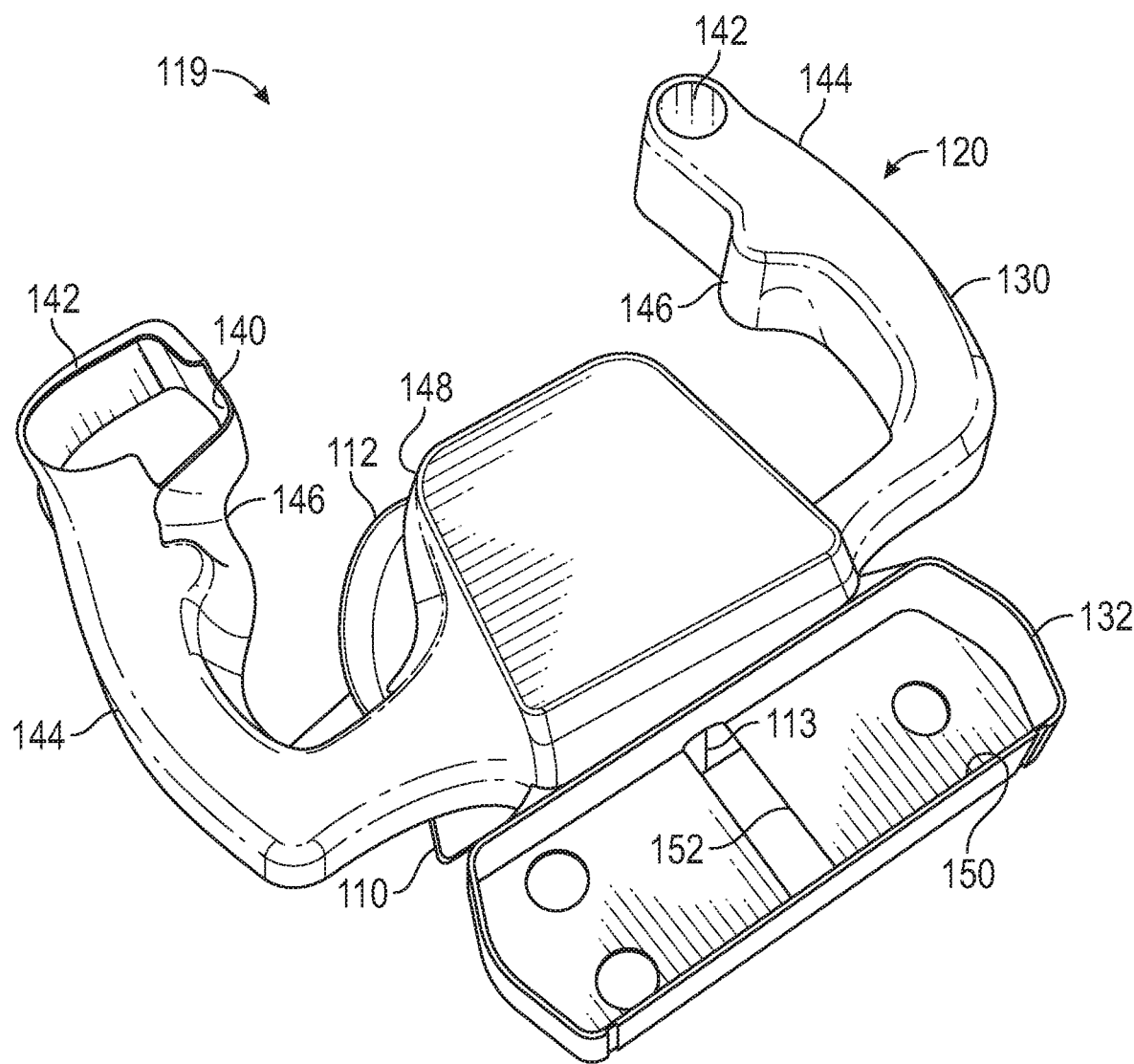
Figure 2C:
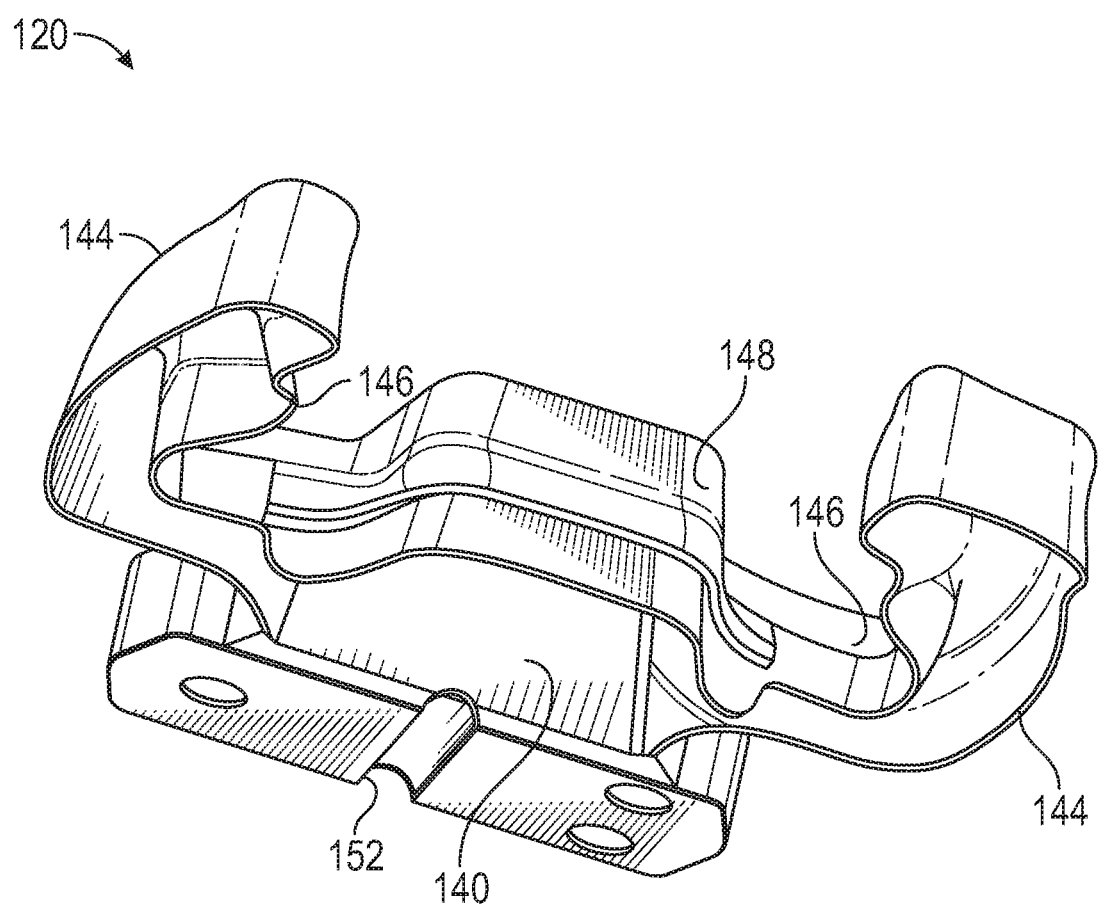
Figure 2D:
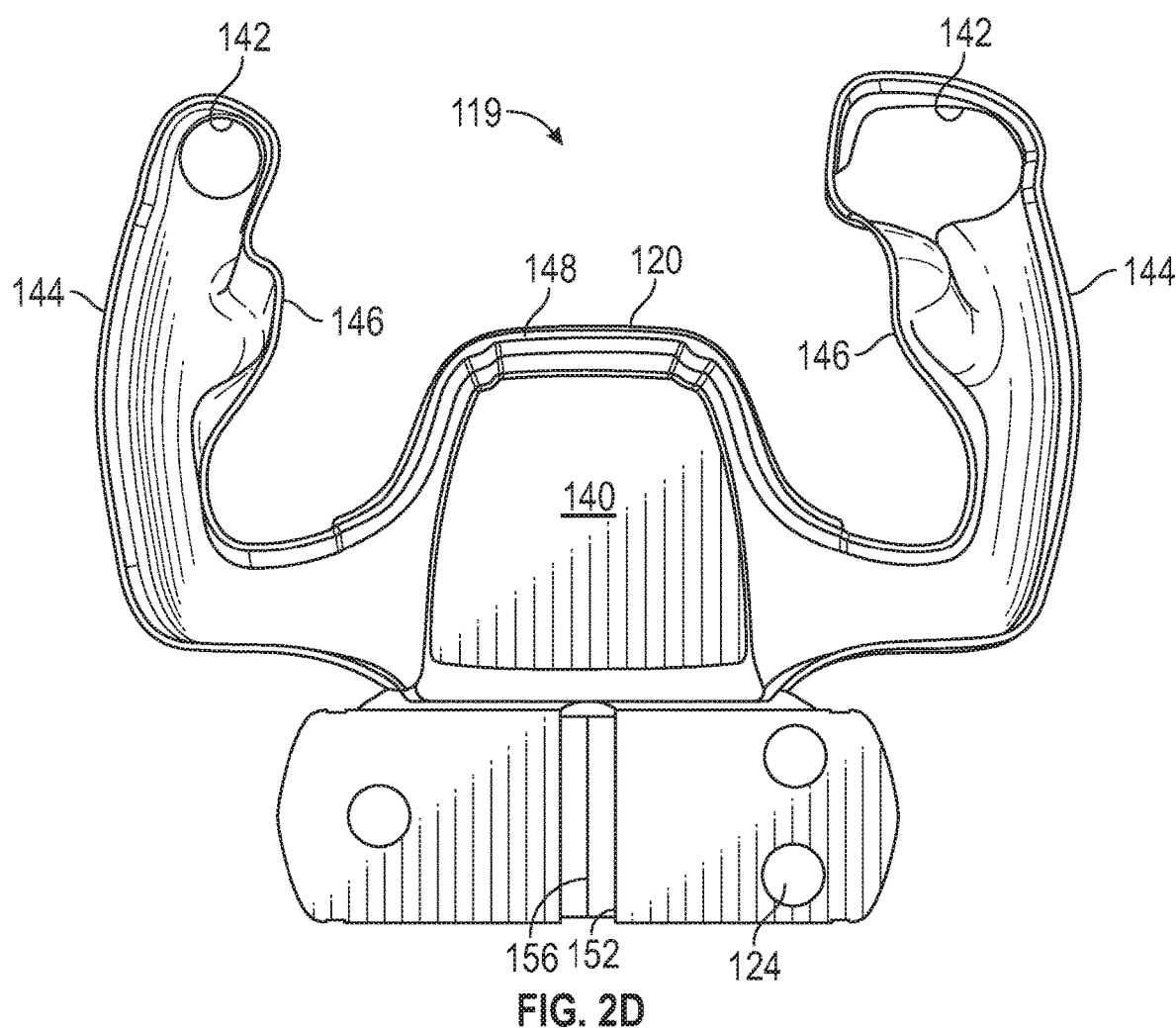

Yoke 112 is configured to attach to the steering column. Crew members flying aircraft 100 interact with yoke 112 to manipulate control surfaces and provide other flight guidance to aircraft 100. Yoke 112 includes an alignment feature 113, handles 114, buttons 116, and an exposed surface 118. Alignment feature 113 indicates a portion of yoke 112 configured to be used for alignment of yoke 112 on steering column 110. In the example provided, alignment feature 113 is a line at a bottom center of yoke 112 to be aligned with an alignment feature on an inclinometer, as described below and illustrated in FIG. 1 and FIG. 2B.

Handles 114 are configured to be grasped by crew members of aircraft 100 to assist with moving yoke 112 for flight guidance. Buttons 116 are disposed on distal portions of handles 114 to provide trim input, autopilot disconnect inputs, and the like to aircraft 100. It should be appreciated that other configurations of a yoke may be utilized, such as a single inceptor, without departing from the scope of the present disclosure.

Exposed surface 118 is an outwardly facing surface that is visible to crew members during flight of aircraft 100. Exposed surface 118 is occasionally damaged during installation and alignment of yoke 112 on steering column 110 during conventional installations of yoke 112. For example, technicians charged with installation of yoke 112 may place objects on top of yoke 112 or may scratch yoke 112 while moving about the flight deck. Yoke 112 is often replaced when exposed surface 118 is damaged. Accordingly, the present disclosure relates to a yoke alignment assembly that protects exposed surface 118 and provides an integrated inclinometer holding portion.

Referring now to FIGS. 2A-D, and with continued reference to FIG. 1, components of a yoke alignment assembly 119 are illustrated in various views. Yoke alignment assembly protects exposed surface 118 and includes beneficial inclinometer holding and alignment features. Yoke alignment assembly 119 includes a rigid cover 120, a flexible cover 122, and an inclinometer 124.

Rigid cover 120 defines a protective portion 130 and an inclinometer portion 132. In the example provided, rigid cover 120 is created using additive manufacturing techniques, such as fused deposition modeling. Protective portion 130 defines an interior surface 140, button apertures 142, handle portions 144, a snap fit portion 146, and an upper part 148. In the example provided, interior surface 140 is a continuous surface that conforms to and substantially completely covers outwardly facing exposed surface 118 of yoke 112.

Button apertures 142 are disposed at distal portions of handle portions 144 and are aligned with buttons 116 of yoke 112 to expose buttons 116 for testing during installation of yoke 112. Handle portions 144 are configured to cover handles 114.

Snap fit portion 146 cooperates with handles 114 of yoke 112 to resist removal of yoke alignment assembly 119 from yoke 112. For example, snap fit portion 146 may have a reduced width relative to a widest part of handles 114. Accordingly, to remove rigid cover 120 from yoke 112, snap fit portion 146 must flex outwardly to clear handles 114.

Inclinometer portion 132 defines a cavity 150 and an alignment aperture 152. In the example provided, inclinometer portion 132 is disposed below protective portion 130 abutting a bottom of yoke 112 when installed on yoke 112. Cavity 150 has a shape that is similar to a shape of inclinometer 124 to promote alignment of inclinometer with yoke 112 and resist movement of inclinometer 124 within cavity 150. Alignment aperture 152 is configured to expose the alignment indicator of the inclinometer and is in alignment with alignment feature 113 of yoke 112. Accordingly, inclinometer 124 may be accurately aligned with yoke 112 to assist with accurate alignment of yoke 112 with steering column 110.

Flexible cover 122 is a flexible material secured to upper part 148 of protective portion 130. As used herein, the term "flexible" means the material offers little to no resistance to bending. In the example provided, flexible cover 122 is leather. In some embodiments, flexible cover 122 is nylon, wool, cotton, carbon fiber, or any suitable fabric. Flexible cover 122 may be secured to protective portion 130 by any suitable attachment arrangement. In the example provided, flexible cover 122 is riveted to upper part 148. In some embodiments, flexible cover 122 is adhered, melted into, screwed, clamped, or otherwise fastened to protective portion 130.

Inclinometer 124 measures angles of inclination of inclinometer 124. Inclinometer 124 is disposed in cavity 150 of inclinometer portion 132 of rigid cover 120. A top of inclinometer 124 opposes a bottom of yoke 112 when yoke alignment assembly 119 is installed on yoke 112. In the example provided, inclinometer 124 is held in cavity 150 by zip ties 154. In some embodiments, inclinometer is held in cavity 150 by snap portions defined by inclinometer portion 132 or by other fasteners.

Inclinometer 124 includes an alignment feature 156 on a bottom portion of inclinometer 124. In the example provided, alignment feature 156 is a line on a housing of inclinometer 124. Alignment feature 156 is visible through alignment aperture 152 to assist with alignment of alignment feature 156 with alignment feature 113 of yoke 112.

Figure 3:
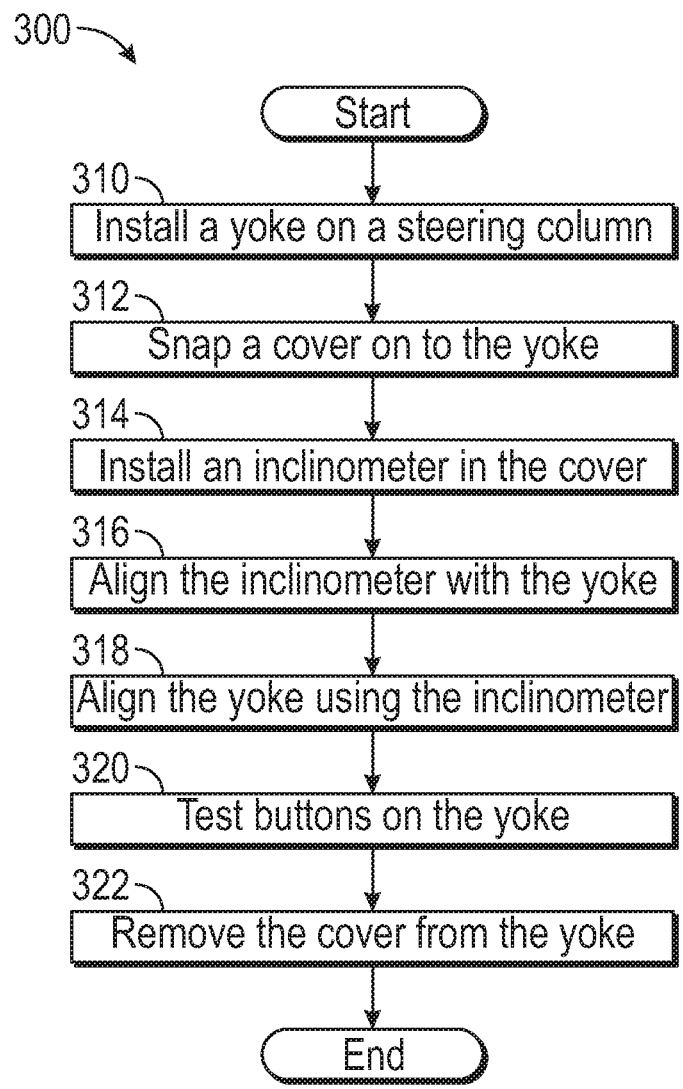
FIG. 3 is a flow diagram illustrating a non-limiting embodiment of a method for aligning a yoke in an aircraft in accordance with the teachings of the present disclosure.

Referring now to FIG. 3, and with continued reference to FIGS. 1 and 2A-C, a method 300 of aligning a yoke on an aircraft column is illustrated in flow diagram form. In the example provided, method 300 uses yoke alignment assembly 119 to align yoke 112 with steering column 110.

Task 310 installs a yoke on a steering column. For example, a technician may place yoke 112 on steering column 110. Task 312 snaps a cover onto the yoke. For example, the technician may snap rigid cover 120 onto yoke 112. Task 314 installs an inclinometer in the cover. For example, the technician may put inclinometer 124 into cavity 150 of inclinometer portion 132 of rigid cover 120.

Task 316 aligns the inclinometer with the yoke. For example, the technician may line up alignment feature 156 of inclinometer 124 with alignment feature 113 of yoke 112 through alignment aperture 152 of inclinometer portion 132 of rigid cover 120.

Task 318 aligns the yoke using the inclinometer. For example, the technician may read the angle of inclination of inclinometer 124, rotate yoke 112, and adjust a position of yoke 112 to align yoke 112 with steering column 110. Task 320 tests buttons on the yoke. For example, the technician may press buttons 116 through button apertures 142 and confirm receipt of any appropriate signals on computers of aircraft 100.

Task 322 removes the cover from the yoke. For example, the technician may pull snap fit portion 146 to release rigid cover 120 from yoke 112 and may pull rigid cover 120 away from yoke 112 to complete the yoke alignment procedure and end method 300.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A yoke alignment assembly for aligning an aircraft yoke with a column, the yoke alignment assembly comprising:
   a rigid cover defining a protective portion configured to protect the yoke and an inclinometer portion configured to hold an inclinometer; and
   a flexible cover secured to an upper part of the protective portion and configured to protect the yoke.

2. The yoke alignment assembly of claim 1, further comprising the inclinometer disposed in the inclinometer portion of the rigid cover.

3. The yoke alignment assembly of claim 1, wherein the protective portion of the rigid cover defines an interior surface and a button aperture, the button aperture configured to align with a button of the aircraft yoke when the yoke alignment assembly is installed on the aircraft yoke and the interior surface configured to conform to and cover an outwardly facing surface of the aircraft yoke.

4. The yoke alignment assembly of claim 3, wherein the protective portion of the rigid cover defines a handle portion configured to cover a handle of the aircraft yoke, and wherein the protective portion of the rigid cover defines the button aperture at a distal end of the handle portion.

5. The yoke alignment assembly of claim 1, wherein the rigid cover is configured to attach the yoke alignment assembly to the aircraft yoke.

6. The yoke alignment assembly of claim 5, wherein the rigid cover defines a snap fit portion configured to cooperate with the aircraft yoke to resist removal of the yoke alignment assembly when the yoke alignment assembly is installed on the aircraft yoke.

7. The yoke alignment assembly of claim 1, wherein the inclinometer further includes an alignment indicator, and wherein the inclinometer portion of the rigid cover defines an alignment aperture configured to expose the alignment indicator of the inclinometer.

8. The yoke alignment assembly of claim 7, wherein the inclinometer portion of the rigid cover defines the alignment aperture in alignment with an expected position of an alignment feature of the aircraft yoke when the yoke alignment assembly is installed on the aircraft yoke.

9. An aircraft in a partially completed manufacturing state, the aircraft comprising:
   a steering column;
   a yoke configured to attach to the steering column; and
   a yoke alignment assembly secured to the yoke, the yoke alignment assembly comprising:
     a rigid cover defining a protective portion and an inclinometer portion;
     a flexible cover secured to an upper part of the protective portion; and
     an inclinometer disposed in the inclinometer portion of the rigid cover.

10. The aircraft of claim 9, wherein the yoke defines an outwardly facing surface, and wherein the protective portion of the rigid cover defines an interior surface conforming to and covering the outwardly facing surface of the yoke.

11. The aircraft of claim 9, wherein the yoke includes a button, and wherein the protective portion of the rigid cover defines a button aperture aligned with the button of the yoke to expose the button.

12. The aircraft of claim 11, wherein the yoke includes a handle and the button is disposed on a distal end of the handle, and wherein the protective portion of the rigid cover defines a handle portion configured to cover the handle.

13. The aircraft of claim 9, wherein the rigid cover defines a snap fit portion that cooperates with the yoke to resist removal of the yoke alignment assembly from the yoke.

14. The aircraft of claim 9, wherein the inclinometer further includes an alignment indicator, and wherein the inclinometer portion of the rigid cover defines an alignment aperture configured to expose the alignment indicator of the inclinometer.

15. The aircraft of claim 14, wherein the yoke includes an alignment feature, and wherein the inclinometer portion of the rigid cover defines the alignment aperture in alignment with the alignment feature of the yoke.

16. A rigid cover for protecting an aircraft yoke during installation, the rigid cover comprising:
   a protective portion defining an interior surface configured to conform to and cover an outwardly facing surface of the aircraft yoke;
   an inclinometer portion configured to hold an inclinometer.

17. The rigid cover of claim 16, wherein the protective portion defines a button aperture configured to align with a button of the aircraft yoke when the rigid cover is installed on the aircraft yoke.

18. The rigid cover of claim 17, wherein the protective portion of the rigid cover defines a handle portion configured to cover a handle of the aircraft yoke, and wherein the protective portion of the rigid cover defines the button aperture at a distal end of the handle portion.

19. The rigid cover of claim 16, wherein the rigid cover defines a snap fit portion configured to cooperate with the aircraft yoke to resist removal of the rigid cover when the rigid cover is installed on the aircraft yoke.

20. The rigid cover of claim 16, wherein the inclinometer portion defines an alignment aperture configured to expose an alignment indicator of the inclinometer when the inclinometer is installed in the inclinometer portion.

\* \* \* \* \*